United States Patent
Kruglinski et al.

[15] 3,654,032
[45] Apr. 4, 1972

[54] APPARATUS FOR MAKING CORRUGATED PAPER BOARD

[72] Inventors: Frank A. Kruglinski, North Bergen; Joseph A. Miller, Englewood, both of N.J.

[73] Assignee: General Corrugated Machinery Co., Inc., Palisades Park, N.J.

[22] Filed: Sept. 12, 1969

[21] Appl. No.: 857,306

[52] U.S. Cl..............................156/470, 156/205, 156/590
[51] Int. Cl. ............................................................B31f 1/20
[58] Field of Search....................156/470, 64, 462, 378, 459, 156/207, 208, 209, 210, 205, 206, 590, 591, 592, 593, 594, 595, 280, 588; 73/73; 34/12; 142/204; 162/205

[56] References Cited

UNITED STATES PATENTS

| | | | |
|---|---|---|---|
| 2,069,063 | 1/1937 | Gibbs | 162/204 |
| 2,993,828 | 7/1961 | Krunsick, Jr. et al. | 162/204 |
| 3,004,880 | 10/1961 | Lord | 156/64 |
| 3,217,425 | 11/1965 | Nikkel | 156/588 |
| 3,467,541 | 9/1969 | Aronsson et al. | 162/207 |
| 3,510,374 | 5/1970 | Walker | 156/64 |

FOREIGN PATENTS OR APPLICATIONS

| | | | |
|---|---|---|---|
| 221,712 | 7/1957 | Australia | 162/204 |

*Primary Examiner*—Benjamin A. Borchelt
*Assistant Examiner*—H. J. Tudor
*Attorney*—Samuelson and Jacob

[57] ABSTRACT

Apparatus for making corrugated paper board of the type having at least two facing sheets. The contacting component webs of supply material are fed along heating plates to adhesively secure them together. To prevent board warpage because of the outer (bottom) facing sheet's being drier than the inner (top) sheet, moisture is added to the outer sheet after the board leaves the heating plates, to equalize the moisture content of the two sheets.

3 Claims, 3 Drawing Figures

Patented April 4, 1972  3,654,032
2 Sheets-Sheet 1
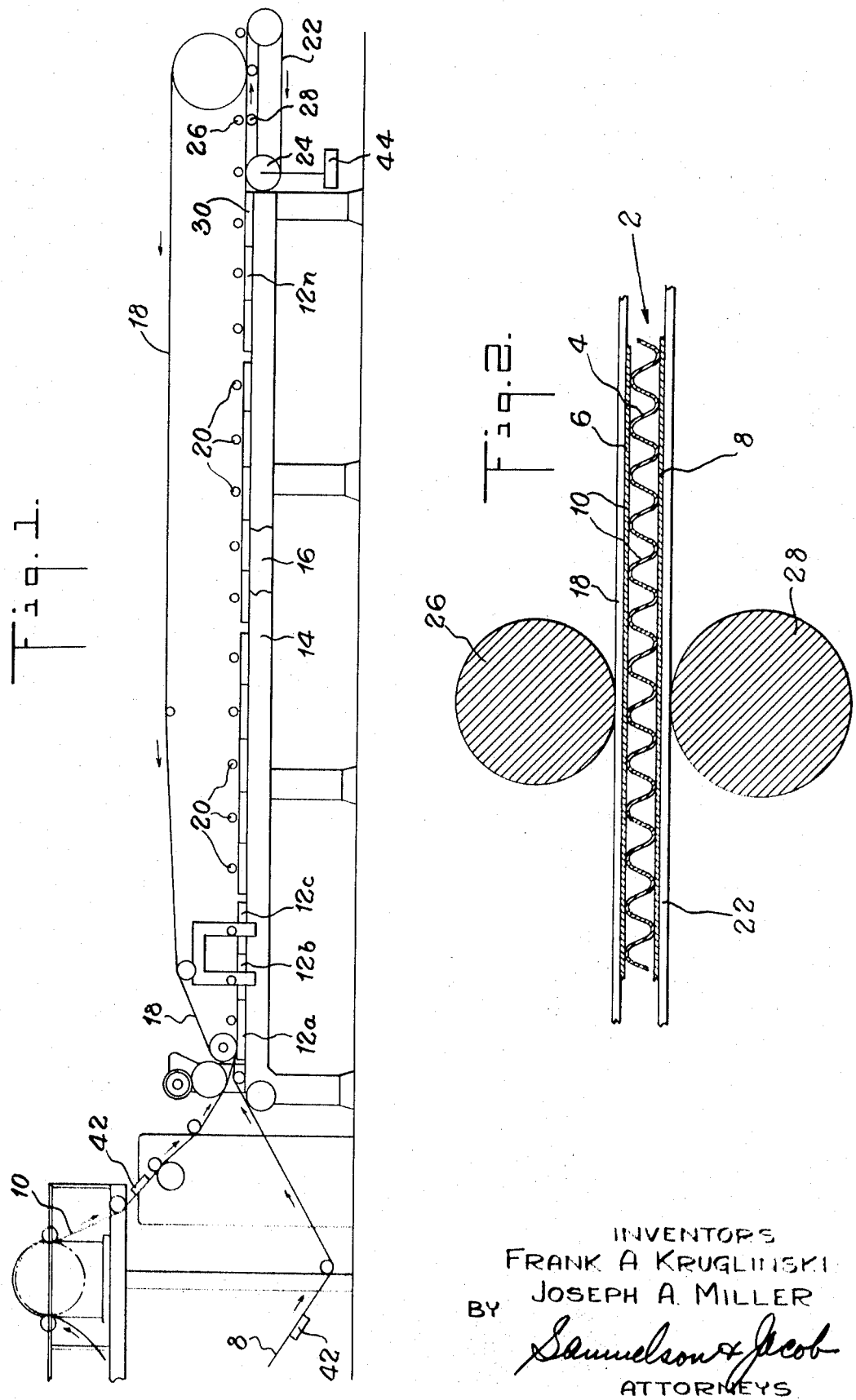
INVENTORS
FRANK A. KRUGLINSKI
JOSEPH A. MILLER
BY Samuelson & Jacob
ATTORNEYS

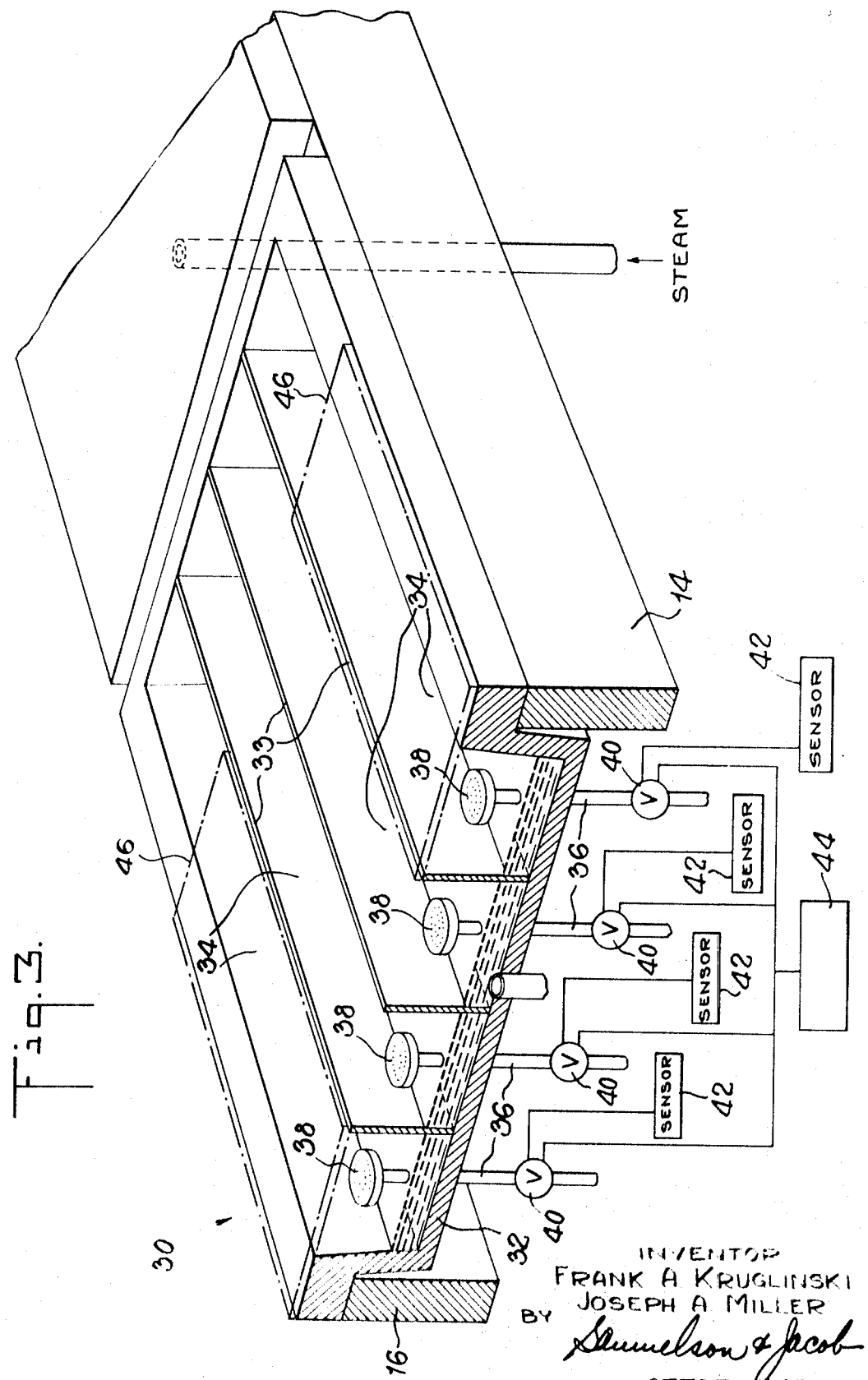

APPARATUS FOR MAKING CORRUGATED PAPER BOARD

In manufacturing corrugated paper board, such as is used for shipping cases which are generally made of a central fluted or corrugated core layer bonded to outer, opposed face sheets, the usual way of effecting this bonding is by using a starch base paste. The board is passed over a series of heated plates to cause the starch to gel and harden, completing the bond. However, this operation tends to dry out the bottom face sheet, i.e., the sheet nearest the heating plates. The heat drives the moisture out of the bottom sheet into the top sheet. Also, the moisture driven out of the starch paste (to cause it to bond) likewise settles in the corrugated core layer and top facing sheet. Because of this considerable resulting moisture differential between the two sheets, the sheet board warps upon drying after leaving the board making machine.

To overcome the problems of feeding warped board in subsequent operations, it has been necessary to stack the cut sheets so that alternate handfuls are reversed. Automation of this alternate stacking has not been economically practical, requiring expensive manual stacking. Furthermore, automatic feeding of such alternately arranged stacks into subsequent machines has been difficult, consequently making it necessary to feed the sheets manually.

In accordance with the present invention, after leaving the heating plates the board passes over moisturizing means for adding moisture to the lower facing sheet to balance the moisture content of the lower and upper sheets. Preferably, the moisturizing means comprises one or more moisturizing chests. The chest or chests may be incorporated in the machine in place of or in addition to the final heating plate or plates. The chest comprises a number of compartments arranged in a row across the width of the longitudinally fed board. Each compartment contains an upwardly extending water supply pipe terminating in an atomizer head for spraying water onto the bottom facing sheet passing over the chest. The amount of water sprayed may be controlled by moisture sensors which sense the moisture content of the sheets. Additional control means may vary the volume of water sprayed in accordance with the speed of the machine operation.

It is therefore an important object of the present invention to prevent warpage in the manufacture of faced corrugated paper board.

It is a further object to prevent such warpage by equalizing the moisture content of the facing sheets of the board.

It is a further object to prevent such warpage by adding moisture to the bottom facing sheet after the board has left the heating means which bonds the board components together.

The above, and other objects, advantages, features and uses of the invention will become apparent to those skilled in the art from the following detailed description of a preferred embodiment of the invention when read in conjunction with the accompanying drawings wherein:

FIG. 1 is a side elevational view of a corrugated board making machine in which the invention is incorporated;

FIG. 2 is an enlarged longitudinal sectional view of a portion of the machine of FIG. 1;

FIG. 3 is an enlarged perspective view showing the moisturizing unit of the machine.

Referring now to the drawings, and particularly FIG. 2 thereof, the reference numeral 2 denotes the corrugated paper board. The board comprises a fluted paper center or core 4 to the opposed high points or peaks of which are adhesively secured opposed top and bottom face sheets 6 and 8. The adhesive most commonly used is a starch base adhesive.

Referring to FIG. 1, this figure shows a conventional machine for making the corrugated board, modified in accordance with the present invention. The material flow is from left to right in FIG. 1. The material supplied to the machine for the manufacture of the board comprises two webs. Web 10 comprises the fluted core 4 and the upper face sheet 6 adhered thereto. The lower peaks of core 4 have a coating of starch adhesive by which the two webs are to be bonded together. The other web consists of the lower face sheet 8, to be bonded to the fluted core 4 in the machine. Web 10 is made in accordance with any well-known technique.

Webs 8 and 10 are fed and guided, by suitably arranged rollers, into contacting relation at the first of a number of heating plates of conventional construction. That is to say, the heating plates are hollow, and steam is fed into them to heat them. In FIG. 1, the numerals 12 (a–n) designate the heating plates, the numerals 12a and 12n respectively denoting the first and the last of the entire series of heating plates. The contacting webs 8 and 10 are fed along the series of heating plates to heat the starch adhesive on the lower peaks of the core 4 to cause it to gel and harden, thereby bonding the bottom facing sheet 8 to the fluted core 4.

The machine has opposed spaced longitudinal side frames 14, 16 on which the heating plates are supported.

The webs 8 and 10 are held in close contact with the heating plates by a ballast belt 18. A series of overlying ballast rollers 20 rest on ballast belt 18 to press the belt against the webs 8, 10 being processed, so that the webs firmly contact one another and lower face sheet 8 is in form heat exchange contact with the heating plates.

At the discharge end of the machine, a lower belt 22 driven in any suitable fashion by a drive roller 24 supports the completed corrugated paper board. Belts 18 and 22, between which the board is held, feed the board from the machine. A series of opposed, cooperating pairs of guide rollers 26, 28 is provided, between which belts 18 and 22 pass.

The machine as described to this point is substantially conventional. As discussed earlier, since the lower facing sheet 8 is closest to the heating plates, most of the moisture is driven out of this sheet into the top facing sheet 6. Additionally, the heating of the adhesive (to bond the lower sheet 8 to the fluted core 4) causes the moisture contained in the adhesive likewise to be driven into the upper sheet. Thus, there is a considerable moisture content differential between the upper and lower facing sheets resulting in the completed board being warped after it dries.

In accordance with the present invention, this objectionable warping is avoided by providing the machine with means for adding moisture to the lower facing sheet 8 after the board has left the heating plates, to equalize the moisture content of the two facing sheets, as will now be described in detail.

Located immediately after, i.e., downstream of, the last heating plate 12n is a moisturizing chest 30 over which the board passes. In fact, the moisturizing chest can replace the last heating plate in commercially available machines. The chest is best seen in FIG. 3. It includes a channel shaped, main member 32, supported on the machine longitudinal frame plates 14, 16. Longitudinal partition plates 33 subdivide the chest into a series of compartments 34, the series being transverse to the longitudinal feeding movement of the paperboard through the machine. Extending upwardly into each compartment is a water supply line 36 which terminates in an atomizer head 38 arranged to spray water onto the lower facing sheet 8 continuously passing overhead. An automatically adjustable valve 40, which may also be manually adjustable, controls the flow in each water line 36.

The valves 40 are adapted to be automatically controlled as follows:

There are provided sensors 42 for measuring the moisture content of the two webs 8 and 10. These sensors may be of any well-known, conventional type having a signal output representative of the moisture content measured. The sensors 42 are located at the input end of the machine, as shown in FIG. 1. One transverse row of sensors senses the moisture content of lower facing sheet web 8. Each of these sensors is located at a transverse position corresponding to a related one of the atomizer spray heads 38. Additionally, there may be provided a row of similarly transversely positioned auxiliary sensors 42 above web 10 for measuring the moisture content of the upper facing sheet.

The signal outputs of the sensors each control the valve of the corresponding transversely positioned water line 36 (FIG. 3), to meter the amount of water sprayed onto the lower facing sheet web by atomizer heads 38 to substantially equalize the moisture content of the upper and lower facing sheets across the entire width of the board.

Control means 44 is also provided for valves 40 to increase and decrease the water flow in accordance with any changes made in the speed of the machine operation. If the board speed is increased, more water may have to be sprayed onto lower facing sheet 8; and conversely, a decrease in the board's speed may necessitate a decrease in the amount of applied water, or vice-versa, depending on conditions.

The speed sensing input to control unit 44 may be taken off any suitable point in the machine, for example, the shaft of drive roller 24 of lower belt 22, as shown in FIG. 1. It will be understood that the details of construction of control unit 44, as well as of sensors 42, form no part of the present invention. Such devices, per se, are of well-known and readily available construction.

If board having a width less than the full width capacity of the machine is to be fed, the unneeded compartments 34 of moisturizing chest 30 can be blocked off or disabled by placing louvers or cover plates 46 over them, as shown in FIG. 3.

The compartments 34 may be provided with suitable drain run-off means to remove accumulated water.

After continuously fed board leaves the moisturizing chest 30, it is fed to the discharge (rightmost in FIG. 1) end of the machine by the upper and lower belts 18 and 22. As the board is moving along, it will be cooling down, and the moisture previously sprayed onto the lower facing sheet 8 by atomizers 38 will have time to be absorbed into this sheet.

After being discharged, the web of completed board is usually cut into sheets.

In addition to eliminating board warpage, the moisture-adding aspect of the present invention, and particularly the fact that the moisture is added after the board leaves the heating plates, has the further advantage of making the board easier to feed through succeeding machines. Adding moisture to the paper makes it more abrasive and increases its coefficient of friction. Thus, the increased moisture content of the lower facing sheet 8 enables it to be more securely gripped and fed by the feeding belts 18, 22, resulting in a more uniform board feed and therefore a more uniform length of the cut-off sheets in an on line cut-off operation. This greatly reduces waste due to length variation of the cut-off sheets, which occurs if the board is not fed uniformly by the belts. It should be noted that if the added moisture is applied to the bottom facing sheet while the board is passing over the heating plates, there is a serious danger that — because of the aforementioned increased abrasiveness and friction — the lower sheet will snag and peel back, causing a break. Then the machine has to be shut down to clear the break and the webs must be rethreaded through the machine.

While the above described preferred embodiment involves making board of the type having only one fluted core and two facing sheets, it will be understood that the principles of the invention can also be used in the manufacture of board having a greater number of layers, e.g., three facing sheets with a fluted core between each of each two adjacent sheets.

Also, while only one moisturizing chest has been shown, a greater number can be used. These can either be in addition to the existing heating plates, or as replacements for the last heating plates at the downstream end of the heating plate series.

Numerous other changes can be made in the specific manner in which the principles of the invention can be practiced. Accordingly, it will be understood that the foregoing disclosure of a specific embodiment of the invention is intended to be exemplary and illustrative only, and not in any way limiting of the spirit or scope of the invention.

The embodiments of the invention in which an exclusive property or privilege is claimed are defined as follows:

1. In a machine for making corrugated paper board of the type having at least one fluted core and at least two spaced facing sheets, from at least two webs of material, each of said webs comprising a respective one of said facing sheets:

means defining a feed path in said machine;

means for feeding said webs along said feed path;

means for bonding said two webs together to form said board, said bonding means comprising heating means;

said heating means being at a first location along said feed path;

moisturizing means for adding moisture to the drier one of said two facing sheets to equalize the moisture content of said two facing sheets to prevent warping of said board;

said moisturizing means being at a second location along said feed path downstream of said heating means and comprising:

a plurality of compartments at several locations along the width of the sheet;

a plurality of spraying devices, there being a separate spraying device disposed in a separate one of said compartments to thereby spray water onto said one facing sheet at said several locations along the width of the sheet.

2. The combination according to claim 1, including:

means for selectively disabling at least one of said spraying devices.

3. The combination according to claim 2, wherein:

said disabling means comprises cover means for the compartment in which said one spraying device is disposed.

* * * * *